United States Patent
Le et al.

(10) Patent No.: US 8,733,819 B1
(45) Date of Patent: May 27, 2014

(54) VARIABLE STIFFNESS ENERGY-ABSORBING COMPONENT FOR VEHICLE OCCUPANT PROTECTION

(71) Applicant: Ford Global Technologies, LLC, Dearborn, MI (US)

(72) Inventors: Jialing Le, Canton, MI (US); Manoharprasad K. Rao, Novi, MI (US); Saeed David Barbat, Novi, MI (US); Mangala A. Jayasuriya, Bloomfield Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 13/747,061

(22) Filed: Jan. 22, 2013

(51) Int. Cl.
*B60J 5/04* (2006.01)
(52) U.S. Cl.
USPC .................................. 296/146.6; 296/187.12
(58) Field of Classification Search
USPC ............. 296/187.03, 187.04, 187.05, 187.06, 296/187.07, 187.09, 187.1, 187.11, 187.12; 293/118, 119; 280/748, 749, 753, 752; 180/274
See application file for complete search history.

(56) References Cited

U.S. PATENT DOCUMENTS

| | | | |
|---|---|---|---|
| 5,356,177 A | 10/1994 | Weller | |
| 6,270,112 B1 * | 8/2001 | Bowers | 280/728.3 |
| 6,966,596 B1 * | 11/2005 | Rinehart | 296/57.1 |
| 7,810,602 B2 | 10/2010 | Evans | |
| 2006/0175848 A1 | 8/2006 | Akad | |
| 2006/0290172 A1 * | 12/2006 | Hirata et al. | 296/187.04 |
| 2007/0100527 A1 | 5/2007 | Rao et al. | |
| 2008/0174148 A1 | 7/2008 | Perotto et al. | |
| 2008/0249687 A1 | 10/2008 | Le et al. | |
| 2009/0152752 A1 | 6/2009 | Han | |
| 2009/0267386 A1 | 10/2009 | Persson | |
| 2011/0210579 A1 | 9/2011 | Marur et al. | |
| 2012/0152674 A1 | 6/2012 | Fukuo et al. | |

FOREIGN PATENT DOCUMENTS

| | | |
|---|---|---|
| DE | 4209944 A1 | 5/1993 |
| DE | 19963068 A1 | 6/2001 |
| DE | 102008022754 A1 | 11/2009 |
| FR | 2873641 A1 | 2/2006 |
| WO | 2009075618 A1 | 6/2009 |
| WO | 2012010348 A1 | 1/2012 |

* cited by examiner

*Primary Examiner* — Joseph Pape
(74) *Attorney, Agent, or Firm* — Frank A. MacKenzie; Brooks Kushman P.C.

(57) ABSTRACT

An energy-absorbing member is mounted within a vehicle door outboard of an interior panel adjacent to a seating position. The member is rotatable between a first position wherein a maximum-stiffness axis of the member is relatively more aligned with an impact vector of an occupant of the seating position during a crash, and a second position wherein the maximum-stiffness axis is relatively less aligned with the impact vector. A controller receives signals from safety-related systems and operates an actuator to move the member between the first and second positions. Selection between the first and second position may be made at the start of a driving cycle based upon signals from an occupant sensor, stored biometric data, and/or a command from the occupant. The selection may be updated after the start of the driving cycle based upon signals from an impact sensor, a vehicle dynamics sensor, and/or a pre-crash sensor.

21 Claims, 3 Drawing Sheets

VARIABLE STIFFNESS ENERGY-ABSORBING COMPONENT FOR VEHICLE OCCUPANT PROTECTION

TECHNICAL FIELD

The present invention relates to an occupant safety system for a motor vehicle, and to an energy-absorbing component having a stiffness that may be varied in response to occupant and/or vehicle conditions.

BACKGROUND

To minimize the possible severity of injury to a vehicle occupant during a crash or similar event, the rigidity or stiffness of any vehicle interior components that the occupant may strike during such an event should be of the correct level to absorb the maximum amount of kinetic energy without applying force to the occupant in a manner or degree that is likely to cause injury. The optimum or desired level of stiffness of the interior component may depend, at least in part, upon the size and weight of the occupant. Recent advances in the fields of computer modeling, vehicle dynamics sensing, crash prediction, and occupant sensing (size, condition, and/or position) provide a wealth of information that may be used to determine the optimal level of stiffness of a vehicle interior component.

SUMMARY

According to an embodiment, occupant protection apparatus comprises an energy-absorbing member mounted to a portion of a vehicle for rotation between a first position wherein a maximum-stiffness axis is relatively more aligned with an impact vector of a vehicle occupant during a crash event, and a second position wherein the maximum-stiffness axis is relatively less aligned with the vector. An actuator moves the member between the first and second positions based upon conditions detected by one or more safety-related sensors.

According to another embodiment, apparatus for a vehicle comprises a door having an interior panel located outboard of a seating position, and at least one member mounted within the door and adjacent to an exterior surface of the panel. The member is rotatable between a first position wherein a maximum-stiffness axis is relatively more aligned with an impact vector of an occupant seated in the seating position during a crash event, and a second position wherein the maximum-stiffness axis is relatively less aligned with the impact vector. A controller receives signals from a safety-related system and operates an actuator to move the member between the first and second positions.

According to another embodiment, a method of improving protection of an occupant of a vehicle during a crash comprises moving a member disposed adjacent to a cabin of the vehicle between a first position wherein a maximum-stiffness axis of the member is relatively more aligned with an impact vector of an occupant during the crash, and a second position wherein the axis is relatively less aligned with the impact vector. The movement between the two positions is in in response to a signal from one or more occupant safety systems.

The signal(s) from the safety-related sensor(s) may indicate an occupant condition, such as physical size or position. The signals may indicate a vehicle dynamic condition, such as whether the vehicle is currently involved in a crash and/or is about to strike another object.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
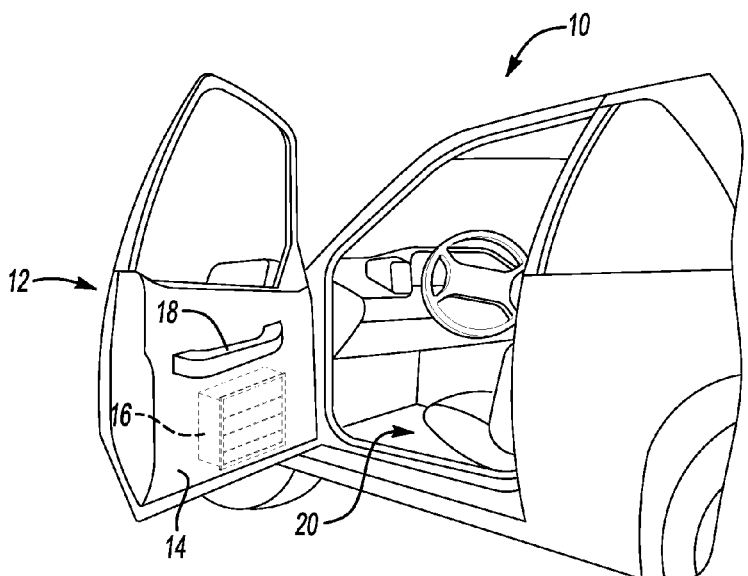
FIG. 1 is a partial schematic view of a motor vehicle with a variable-stiffness component installed in a lower portion of a driver-side door.
Figure 2:
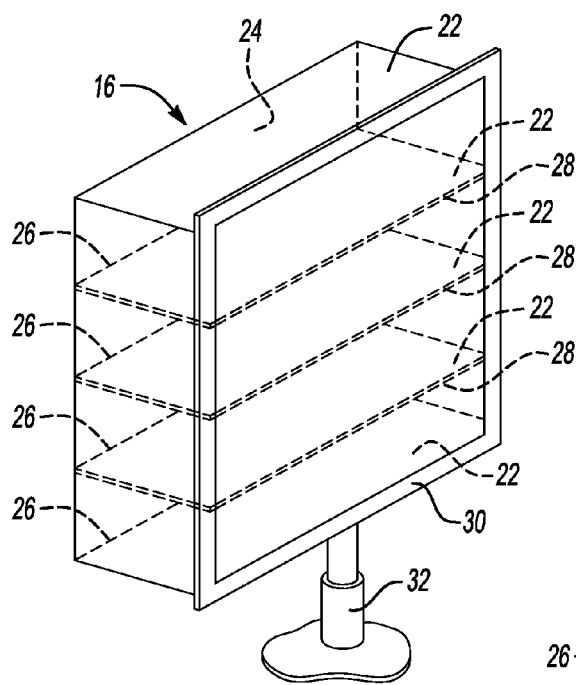
FIG. 2 is a simplified schematic view of a variable-stiffness component in a maximum stiffness condition.
Figure 3:
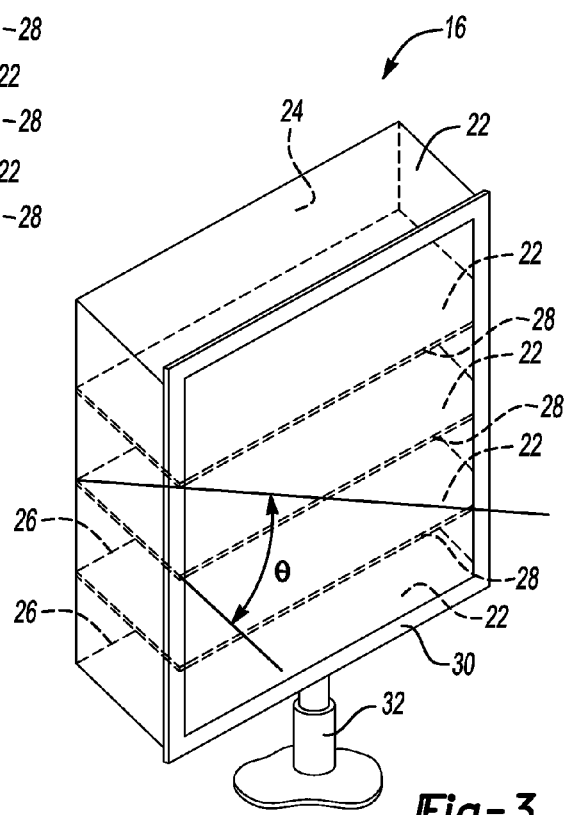
FIG. 3 is the variable-stiffness component of FIG. 2 in a reduced stiffness condition.

Referring to FIG. 1, a motor vehicle 10 has a side door 12 shown in an open position to expose an interior panel 14 of the door. A variable-stiffness component 16 is mounted inside the door 12, behind interior panel 14. Variable-stiffness component 16 is shown located below an arm rest 18 where, when door 12 is closed, it will be directly outboard of the pelvis of an occupant (not shown) seated in a seat 20 of the vehicle.

As seen in FIGS. 2-5, an embodiment of a variable-stiffness component 16 comprises a plurality of energy-absorbing members 22 mounted to rotate or pivot relative to the structure of door 12. For example, variable-stiffness component 16 may comprise an outboard wall 24 that is fixed relative to door 12, and outboard edges 26 of members 22 may be attached to the outboard wall by hinge-like features such that the members may rotate about their outboard edges. Inboard edges 28 of members 22 are secured to an inboard frame 30 that is moveable relative to the structure of door 12 and to outboard wall 24 in a generally vertical plane. Vertical movement of frame 30 and inboard edges 28 relative to the fixed outboard wall 24 and outboard edges 26 thereby changes the angle at which members 22 are oriented relative to horizontal.

An actuator 32 is operatively connected with frame 30 to move the frame and thereby change the angular alignment of members 22. Actuator 32 may, for example, be an electromagnetic, electromechanical, pneumatic, pyrotechnic, or similar high speed device.

Figure 4:
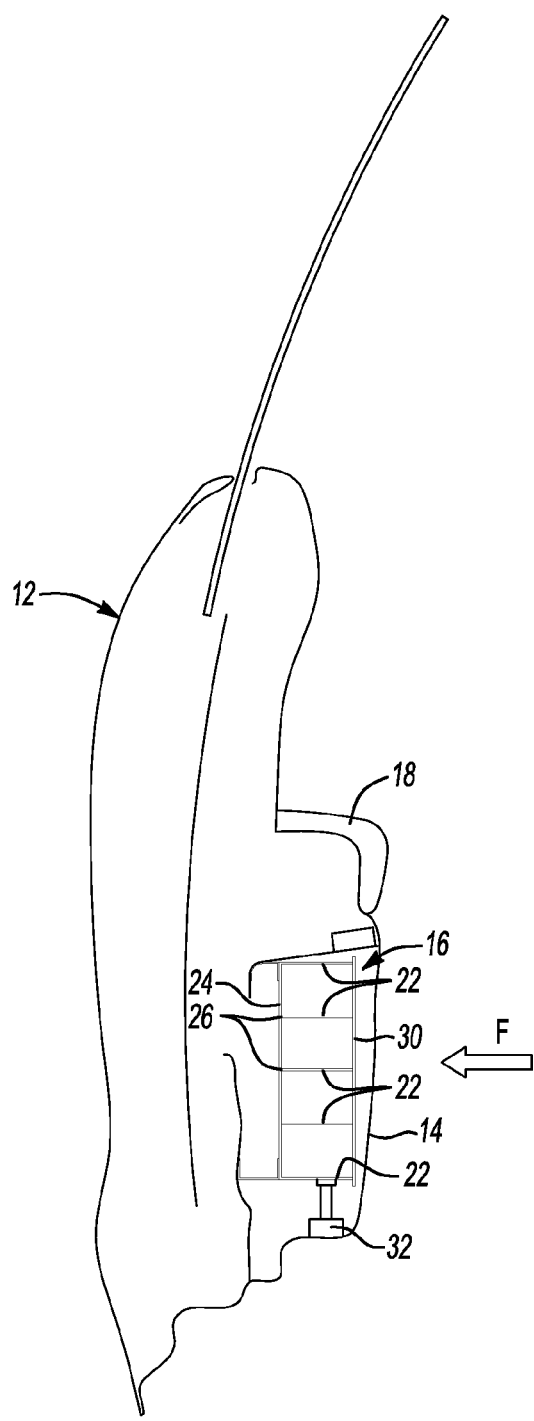
FIG. 4 is a schematic vertical cross section through a vehicle door showing a variable-stiffness component in a maximum stiffness condition.
Figure 5:
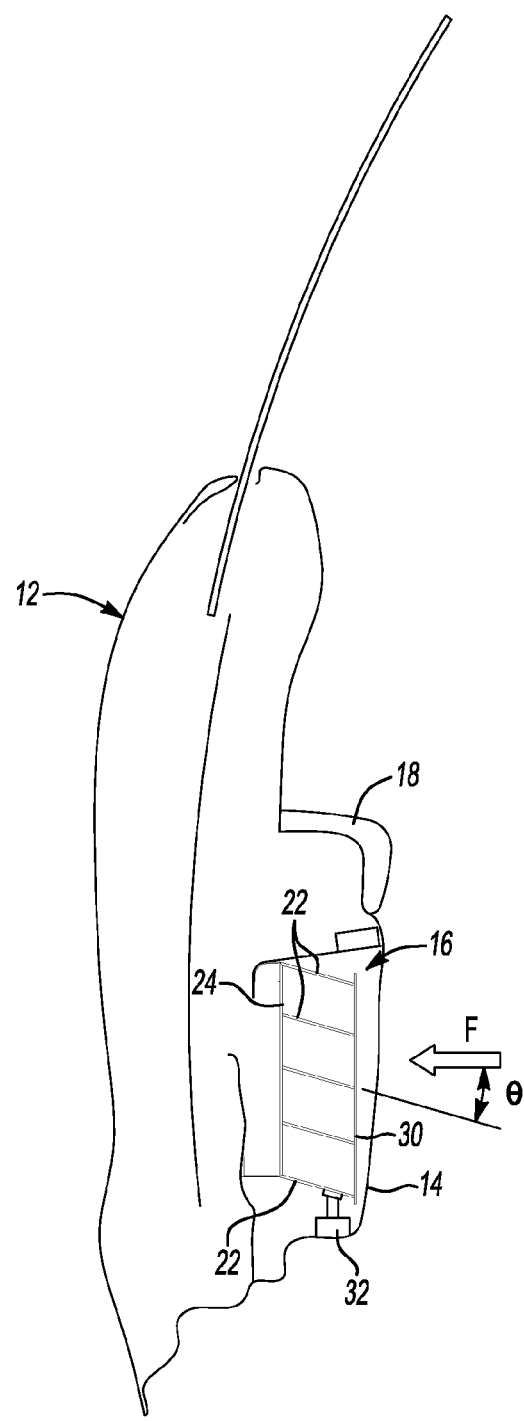
FIG. 5 is a view similar to FIG. 4 showing the variable-stiffness component in a reduced stiffness condition.

Referring now to FIGS. 4 and 5, variable-stiffness component 16 is shown mounted within an interior cavity of the door 12 adjacent to an outboard or exterior surface of interior panel 14. In this context, the terms "interior" and "exterior" refer to directions relative to vehicle overall and to the interior of the vehicle cabin. That is, the interior or inboard direction is towards the right in FIGS. 4 and 5, and the exterior or outboard direction is toward the left. Actuator 32 is shown located below members 22 such that it pulls downward on frame 30, but it may be located at any location relative to door 12 as necessary for packaging considerations.

FIG. 4 shows the variable-stiffness component 16 in a maximum stiffness condition in which members 22 are oriented such that their respective axes of maximum stiffness are in close angular alignment (parallel or nearly parallel) with the vector F of an occupant impact (relative to the vehicle) on the interior surface of the door that is expected to occur during a side impact crash event. In the disclosed embodiment in which energy absorbing members 22 are flat, the maximum-stiffness axis lies in the plane of the flat members. When the maximum-stiffness axes of members 22 are in angular alignment (parallel) with the impact vector F, variable-stiffness component 16 provides the largest possible amount of resistance to an occupant impact, and thereby serves as a relatively stiff pelvis pusher. Such a maximum stiffness condition may be appropriate for a vehicle occupant that is relatively large and/or heavy.

FIG. 5 depicts variable-stiffness component 16 in a reduced stiffness condition. Actuator 32 has been activated to move frame 30 downward such that members 22 are rotated in a clockwise direction (as viewed in FIGS. 4 and 5) about their outboard edges 26. This rotation causes the maximum-stiffness axes of members 22 to form an angle $\theta$ with impact vector F. As angle $\theta$ increases, the effective stiffness of each of the members 22 and therefore the resulting overall stiffness of component 16 is reduced. Such a reduction from the maximum stiffness condition may be appropriate, for example, when the occupant is lighter and/or smaller.

Variable-stiffness component 16 is depicted as comprising five energy-absorbing members 22, but any number of members may be used as required to achieve the desired amount of stiffness/energy absorption. The amount of energy absorbed by the deforming members 22 (and, conversely, the amount of energy transferred to an occupant) will depend on many variables that are considered and balanced during the engineering design process. Among these variables are the materials from which the members 22 are fabricated and the geometry (length, thickness, taper, holes, ridges, etc.) of the members. Members 22, while schematically shown herein as being generally flat, may be of any shape having an axis of maximum stiffness that may be rotated through an angle relative to an impact vector in order to achieve a variation in the effective stiffness of the member under an impact. Members 22 may have exterior and/or interior features such that they will deform or "crumple" in a predictable manner.

Figure 6:
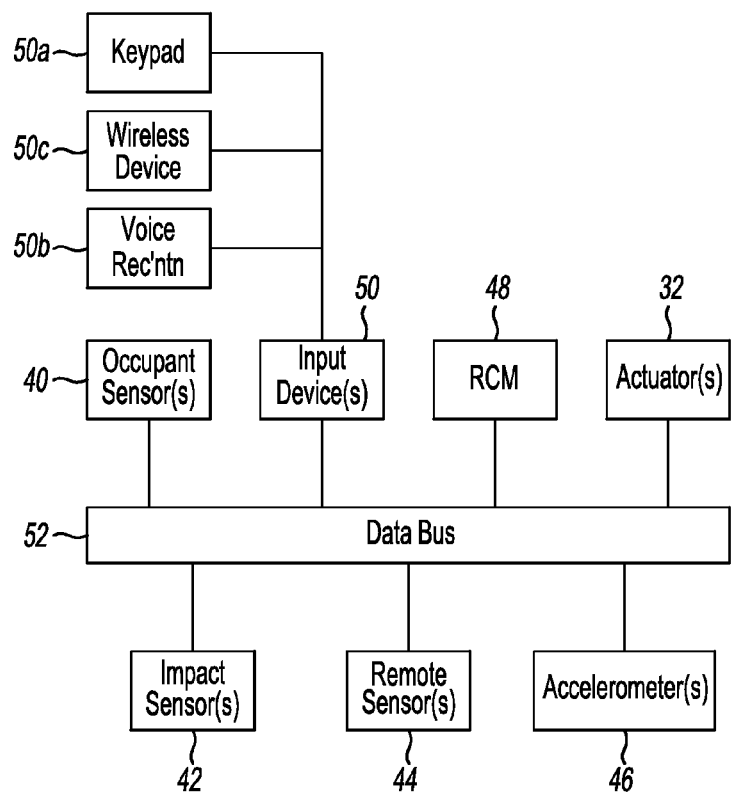
FIG. 6 is a schematic system block diagram of a control system for a variable-stiffness component.

The angle $\theta$ and thus the stiffness of component 16 may be adjusted based on any number of factors and by various automatic or manual means. FIG. 6 is a schematic system block diagram of a control system whereby actuator 32 may be controlled to set the stiffness to a desired appropriate level. The control system may include various sensors such as: one or more occupant condition sensor(s) 40 detecting the size and/or position of an occupant relative to the vehicle interior; one or more impact sensor(s) 42 detecting crush or intrusion into the vehicle structure; one or more remote (pre-crash) sensors 44 such as radar, LIDAR, or vision systems detecting other objects in proximity to the vehicle and may be used to predict a collision; and one or more accelerometer(s) 46 detecting a dynamic state of the vehicle (including crash and roll-over condition).

Input devices 50 may include one or more means by which the size and/or identity of a vehicle occupant may be input to allow the stiffness of component 16 to be adjusted to an optimum condition for that occupant. For example, an occupant may enter his/her personal identity and/or physical size using a keypad 58*a*, a voice recognition system 50*b*, and/or a wireless device 50*c*. Wireless device 50*c* may, for example, be a keyless entry fob, a "smart phone", or some other communication device including a storage device containing biometric data related to the occupant to whom the device is assigned. For use in the present system, such information may include or relate to the occupant's physical stature, weight, age, or health condition.

A restraints control module (RCM) 48 receives inputs from the various available safety-related systems (this term broadly including sensors such as 40-46 and input devices such as 50*a*-*c*) and controls operation of the actuator 32. RCM 48 may also control activation/actuation of other occupant safety devices such as air bags, side curtain, etc. (not shown). The system illustrated in FIG. 6 utilizes a data bus 52 to enable communication between the various components. However, other system architectures are well known in the art and may also be used.

In a first possible implementation of the disclosed system, the stiffness of variable-stiffness component 16 may be adjusted to match the physical characteristics of the vehicle occupant at the beginning of a drive cycle by means of input device(s) 50. The stiffness condition of the component 16 may also be adjusted based on the seating position of the occupant as detected by occupant sensor(s) 40, such as a seat position indicator and/or more advanced sensors using vision, ultrasonic, or capacitive sensing. For example, if a wireless device 50 assigned to and carried by an occupant contains information identifying that occupant as being a 95$^{th}$ percentile male, the variable-stiffness component may be set to a relatively high stiffness condition. If the wireless device 50*c* identifies the occupant as a 5$^{th}$ percentile female, and this is confirmed by the seat position sensor indicating that the seat 20 has been adjusted to a relatively far-forward position, the variable-stiffness component 16 will be adjusted to a relatively low stiffness condition.

The initial stiffness setting selected at the beginning of a drive cycle, as described in the above paragraph, may be maintained throughout that drive cycle or may be altered if other vehicle sensors provide information to RCM 48 indicating that the stiffness should be changed to improve occupant safety. In such a case, RCM 48 may consider signals or inputs from, for example, remote sensors 44 that detect an imminent collision with another vehicle or object; and/or accelerometer 46 and/or impact sensors 42 that detect an actual collision. Based upon signals from such sensors and upon programmed logic (algorithms, look up tables, etc.), RCM 48 may determine that occupant protection in the particular impending or actual collision may be maximized by changing the level of stiffness of variable-stiffness component 16 from that set at the beginning of the drive cycle. If such a determination is made, RCM 48 operates actuator 32 to adjust the angle $\theta$ of component 22 in a manner to provide the desired level of stiffness.

Figure 7:
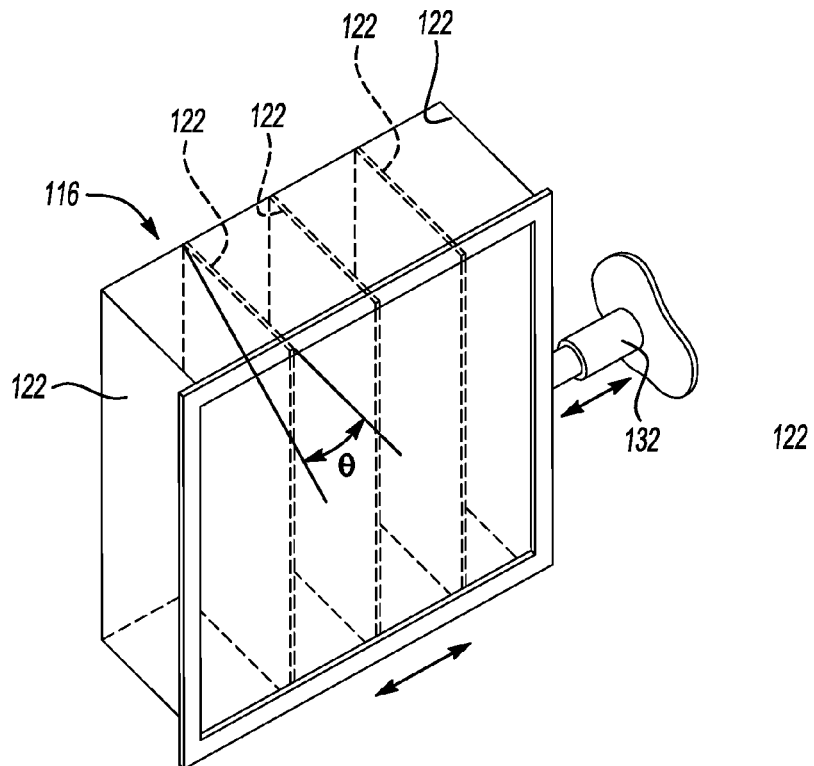
FIG. 7 is a schematic view of a second possible installation of a variable-stiffness component in a vehicle door.

FIG. 7 shows another embodiment of a variable stiffness component 116 in which members 122 are mounted for rotation about generally vertical axes. In this embodiment, the angle $\theta$ between the axes of maximum stiffness and an impact vector is measured in a generally horizontal plane rather than the generally vertical plane as with the first embodiment described herein. The axes about which members 16/116 are rotated preferably lies in a plane that is normal to the expected direction of the impact vector, or as close to normal as is permitted for a given vehicle installation.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. Occupant protection apparatus comprising:
a member mountable adjacent to an interior panel of a vehicle door for rotation between a first position wherein a maximum-stiffness axis of the member is relatively more aligned with an impact vector of a vehicle occupant during a crash event, and a second position wherein the maximum-stiffness axis is relatively less aligned with the vector; and
an actuator moving the member between the first and second positions.

2. The apparatus of claim 1 wherein the member is flat.

3. The apparatus of claim 1 wherein the member is rotated about an outboard edge to change the alignment of the maximum stiffness axis.

4. The apparatus of claim 1 wherein the member is one of a plurality of members, the maximum-stiffness axes of the respective members being approximately parallel with one another when in the first position.

5. The apparatus of claim 4 wherein the members are approximately parallel with one another in the second position.

6. The apparatus of claim 4 wherein the members are movable in unison between the first and second positions.

7. The apparatus of claim 1 wherein the maximum-stiffness axis lies in a horizontal plane when in the first position.

8. The apparatus of claim 1 wherein the member is mounted below an armrest of the door.

9. The apparatus of claim 1 further comprising a controller operating the actuator based upon a signal received from a safety-related sensor.

10. The apparatus of claim 9 wherein the safety-related sensor generates signals indicating at least one of an occupant condition and a vehicle dynamic condition.

11. Apparatus for a vehicle comprising:
a door having an interior panel located outboard of a seating position;
a member mounted within the door and adjacent to an exterior surface of the panel, the member rotatable between a first position wherein a maximum-stiffness axis is relatively more aligned with an impact vector of an occupant seated in the seating position during a crash event, and a second position wherein the maximum-stiffness axis is relatively less aligned with the impact vector;
an actuator moving the member between the first and second positions; and
a controller operating the actuator in response to a signal from a safety-related system.

12. The apparatus of claim 11 wherein the safety-related system comprises at least one of an impact sensor, a vehicle dynamics sensor, a pre-crash sensor, and an occupant condition sensor.

13. The apparatus of claim 12 wherein the occupant condition sensor detects physical size of the occupant.

14. The apparatus of claim 11 wherein the member is mounted at a position horizontally aligned with a pelvis of the seated occupant.

15. A method of improving protection of an occupant of a vehicle during a crash comprising:
responsive to a signal from an occupant safety system, moving a member disposed adjacent to an outboard surface of an interior panel of a cabin of the vehicle between a first position wherein a maximum-stiffness axis of the member is relatively more aligned with an impact vector of an occupant on an interior surface of the interior panel during the crash, and a second position wherein the axis is relatively less aligned with the impact vector.

16. The method of claim 15 wherein a selection between the first position and the second position is made at a start of a driving cycle.

17. The method of claim 16 wherein the selection is made based upon signals from at least one of an occupant sensor, a biometric data storage device, and a command from the occupant.

18. The method of claim 17 wherein the biometric data storage device is part of a wireless device assigned to a specific individual.

19. The method of claim 16 further comprising updating the selection between the first position and the second position after the start of the driving cycle based upon signals from at least one of an impact sensor, a vehicle dynamics sensor, and a pre-crash sensor.

20. Occupant protection apparatus for a vehicle comprising:
a member mountable adjacent to an exterior surface of an interior panel of a cabin of the vehicle for rotation between a first position wherein a maximum-stiffness axis is relatively more aligned with an impact vector of a vehicle occupant on the interior panel during a crash event, and a second position wherein the maximum-stiffness axis is relatively less aligned with the vector; and
an actuator moving the member between the first and second positions.

21. The apparatus of claim 20 wherein the interior panel is below an armrest of a vehicle door.

* * * * *